United States Patent [19]

Huber

[11] 4,371,900
[45] Feb. 1, 1983

[54] EQUALIZATION OF DC NULL IN REPRODUCING A HIGH DENSITY RECORDING

[75] Inventor: William D. Huber, San Jose, Calif.

[73] Assignee: Memorex Corporation, Santa Clara, Calif.

[21] Appl. No.: 227,612

[22] Filed: Jan. 23, 1981

[51] Int. Cl.³ .......................... G11B 5/09; G11B 5/45
[52] U.S. Cl. ........................................ 360/40; 360/46; 360/65
[58] Field of Search ............... 360/46, 67, 65, 45, 360/40

[56]  References Cited
U.S. PATENT DOCUMENTS 3,821,716 6/1974 Ghajar ............................ 360/40
4,264,935 4/1981 Lee .................................. 360/46
4,314,289 2/1982 Haynes ............................ 360/46

Primary Examiner—Vincent P. Canney
Attorney, Agent, or Firm—Philip M. Shaw, Jr.

[57] ABSTRACT

Direct current null in the reproduction of a high density, digital, magnetic recording is equalized by the apparatus which first slims the magnetic head output pulse until one-half the main lobe time width of the pulse is equal to one-half the minimum time between polarity transitions, then, integrates the slimmed pulse, centers it about a zero reference voltage level, and finally, through a limiter, produces an output pulse signal which has abrupt output transitions whenever the centered, integrated pulse crosses the zero reference voltage level.

10 Claims, 22 Drawing Figures

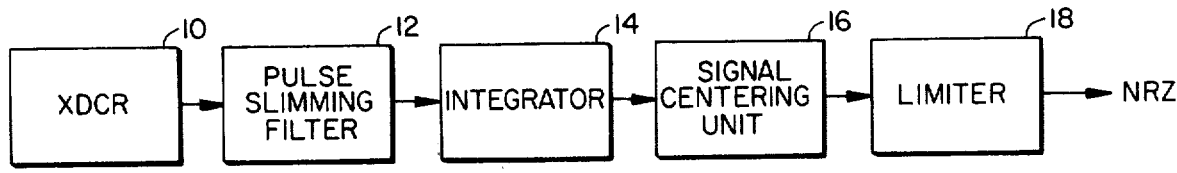
FIG._1.
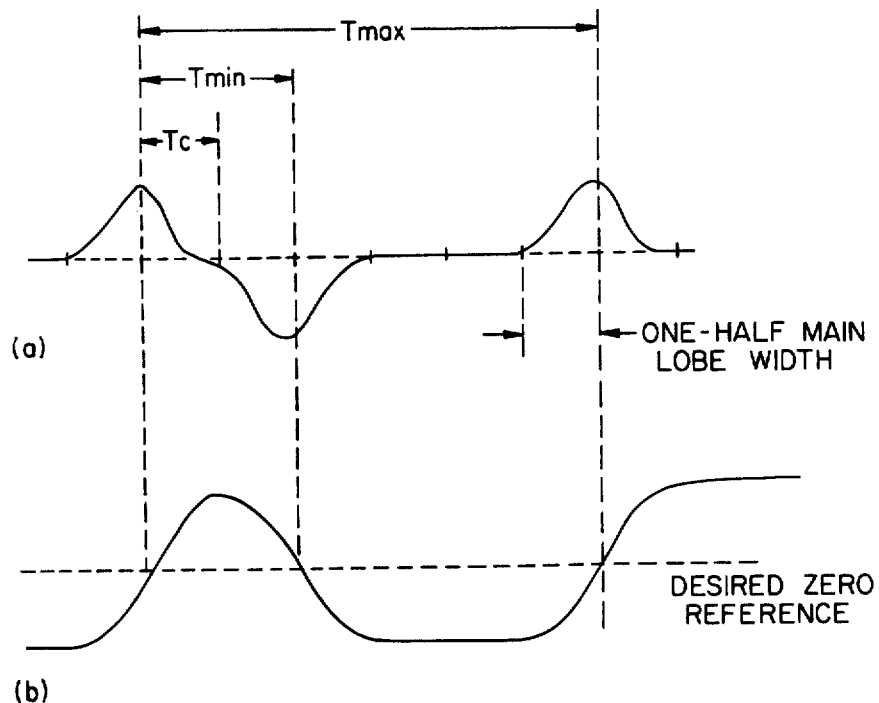
FIG._2.
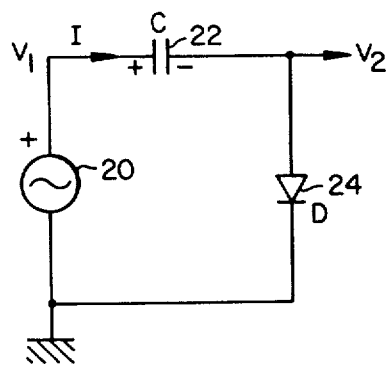
FIG._3a.
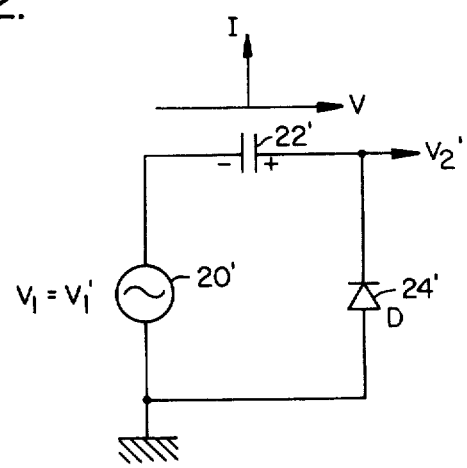
FIG._3b.

FIG._4a. $V_1$
FIG._4b. $V_2$
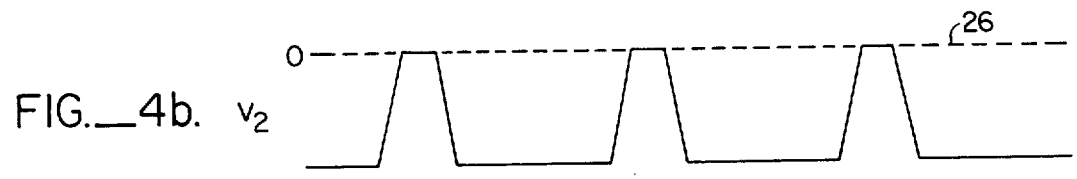
FIG._4c. $V_2'$
FIG._5.
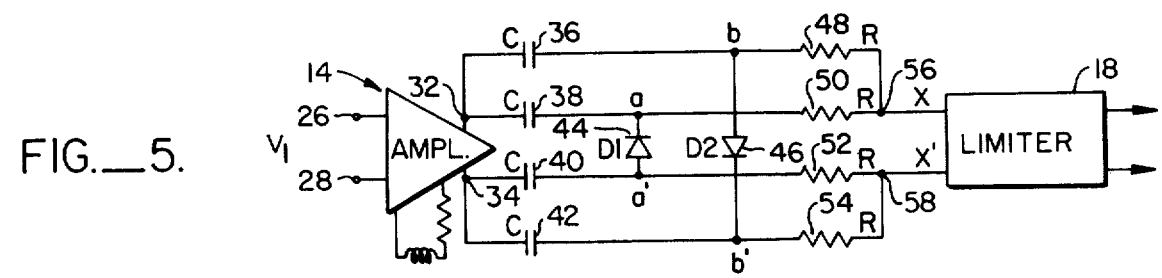
FIG._6a. $V_{aa'}$
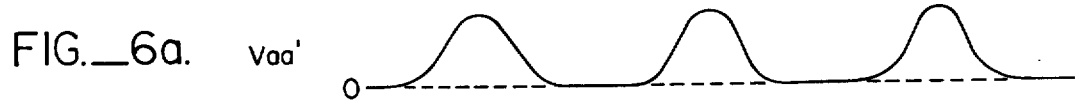
FIG._6b. $V_{bb'}$
FIG._6c. $V_{xx'} = (V_{aa'} + V_{bb'})/2$
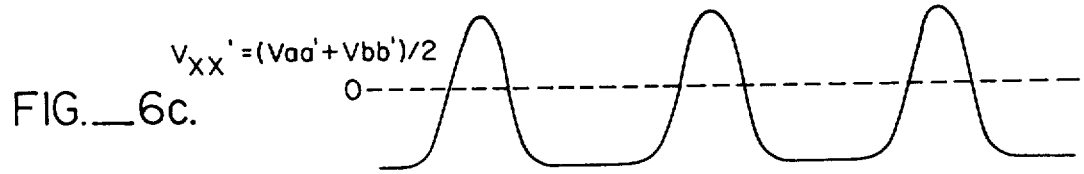

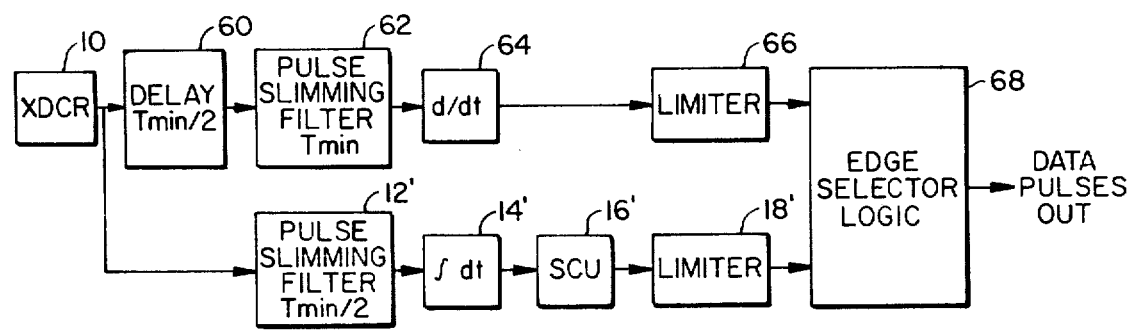
FIG._7.
FIG._8a.
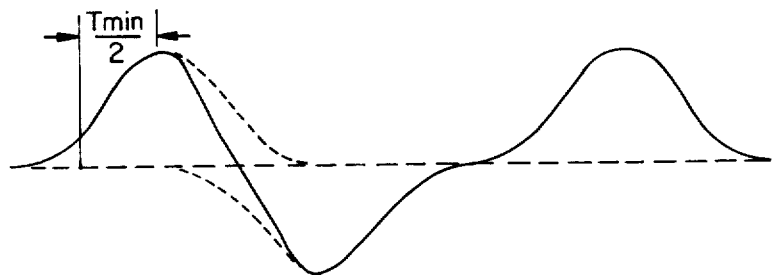
FIG._8b. S(t)
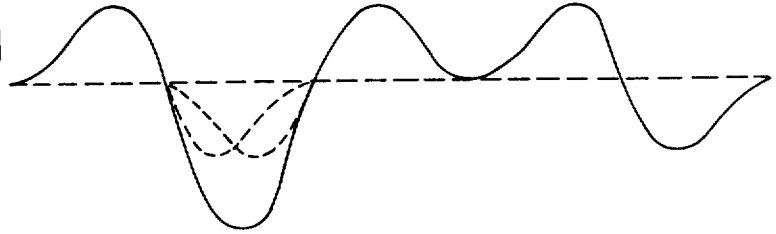
$\frac{d}{dt}[S(t)]$
FIG._8c.
$LIM\{\frac{d}{dt}[S(t)]\}$
FIG._8d.
$LIM\{\int S_{1/2}(t)dt\}$
FIG._8e.
DATA OUT
FIG._8f.

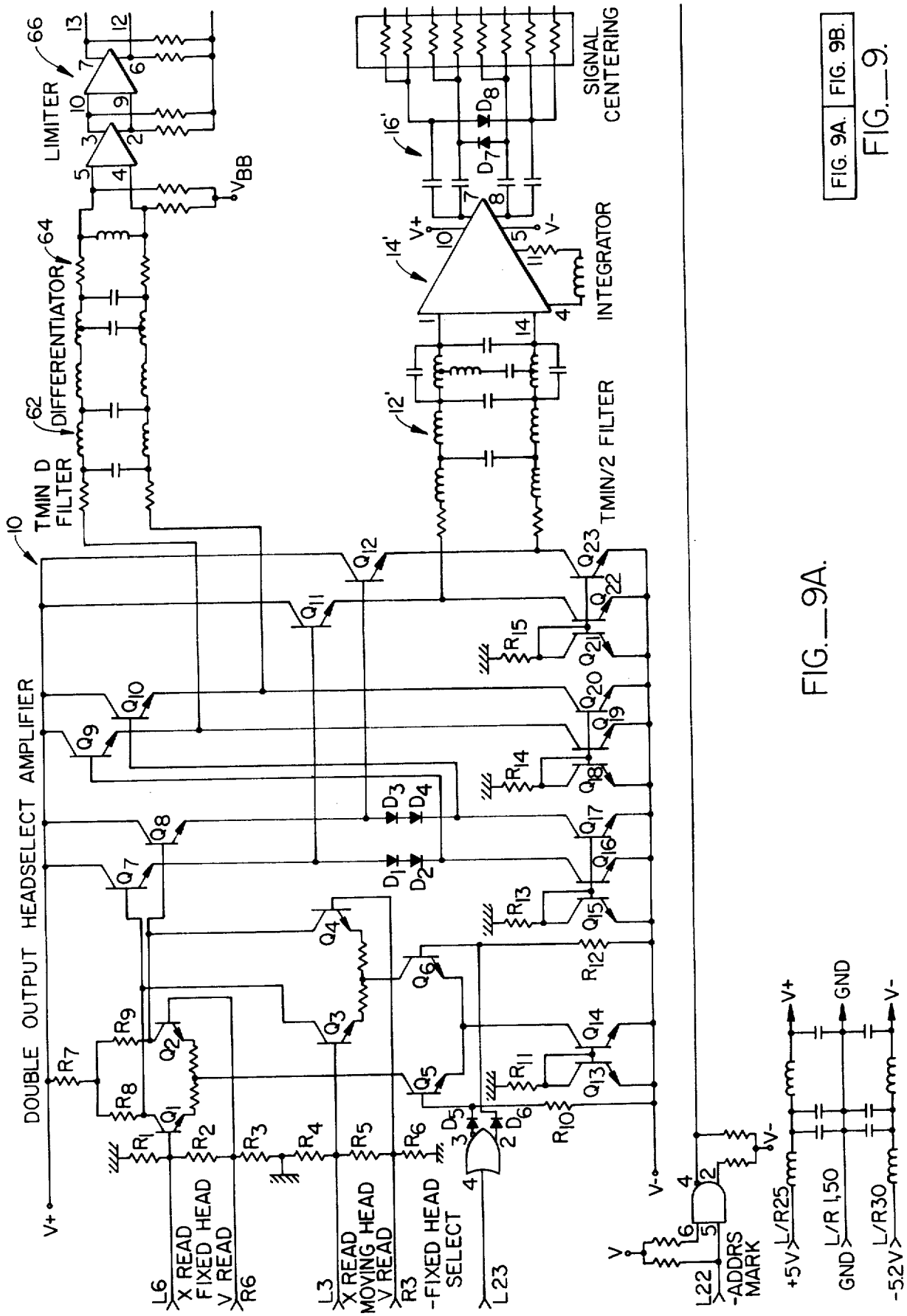
FIG._9A.

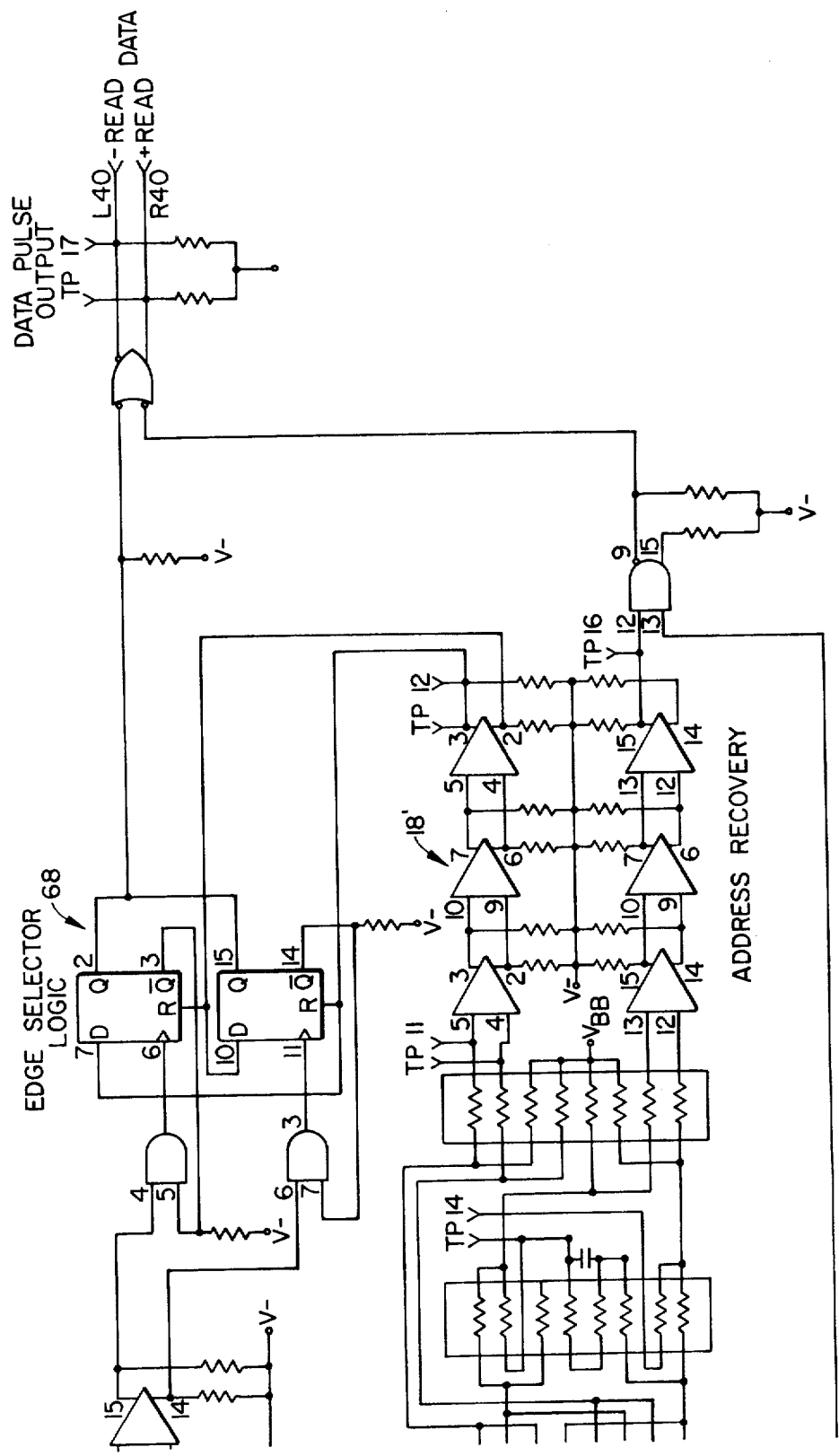
FIG._9B.

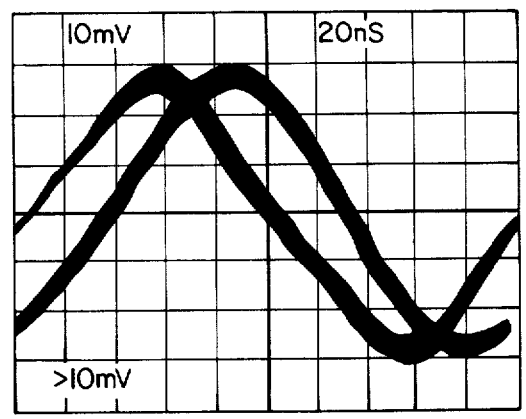
FIG._10A.
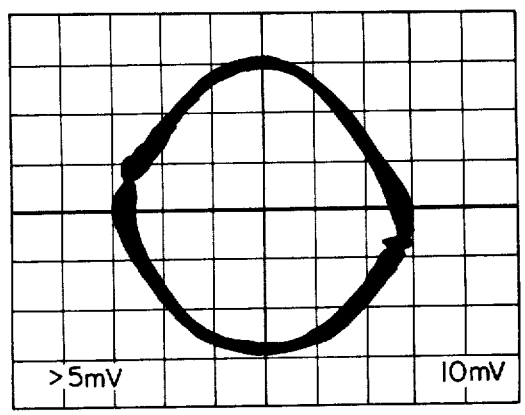
FIG._10B.

4,371,900

EQUALIZATION OF DC NULL IN REPRODUCING A HIGH DENSITY RECORDING

BACKGROUND OF THE INVENTION

It is well known that a magnetic recording channel will not support direct current signals. In playback, the transducer output is proportional to the time derivative of the flux pattern induced in the transducer. There are also bandwidth limitations inherent in these circuits so that the response to an isolated transition in flux may be modeled as a Lorentzian pulse as the derivative of the arc tangent flux transition.

In digital recording, the input signal is invariably a binary (two-level) non-return-to-zero (NRZ) waveform which generally contains a DC component. The recorder must faithfully reproduce this data pattern upon demand. Thus, the idea of filtering the transducer output to restore the input NRZ waveshape seems natural. Restoration of the input waveform in the analog realm requires, also, the restoration of its DC content. Present approaches to DC restoration require some form of a relatively complicated feedback system, such as decision feedback equalization (DFE). To the applicant's knowledge, none of these feedback schemes are used in commercially available magnetic recorders.

SUMMARY OF THE INVENTION

The above problems of restoring the DC content of the input waveform in the analog realm when playing back recorded NRZ data are overcome by the present invention of a system for equalizing the DC null level which system includes a circuit for centering an alternating current input signal about a zero reference voltage level. This alternating current input signal, as will be explained further herein, is derived from the playback transducer after having been slimmed in a pulse slimming filter.

The centering circuit portion of the invention is perhaps the most important part and comprises first and second input terminals for receiving the input signal and first and second output terminals. First, second, third and fourth capacitors, first, second, third and fourth resistors, and first and second diodes are connected to these terminals as follows. The first input terminal is connected through the first capacitor to the anode of the second diode and through the second capacitor to the cathode of the first diode. The second input terminal is connected through the third capacitor to the anode of the first diode and through the fourth capacitor to the cathode of the second diode. The first output terminal is connected through the first resistor to the anode of the second diode and through the second resistor to the cathode of the first diode. The second output terminal is connected through the third resistor to the anode of the first diode and through the fourth resistor to the cathode of the second diode.

The complete system for equalizing the DC null includes, in addition to the the centering circuit, first pulse slimming filter means for receiving each input pulse from the transducer and for slimming the pulse until one-half of the main lobe time width of the slimmed pulse is equal to one-half of the minimum time between transitions ($T_{min}/2$). The slimmed pulse output of the first pulse slimming filter means is received by integrator means and the integrated pulse output is supplied to the first and second input terminals of the centering circuit. First limitor means are connected to the first and second output terminals of the centering circuit for producing an output signal which has abrupt output transitions whenever the output signal of the centering circuit crosses a hypothetical zero reference voltage level.

The foregoing combination reproduces the recorded pattern directly. This circuit can also be applied as a gate generator for a matched filter/optimum time containment/differentiator system. In either of these two approaches, the automatic gain or threshhold control common in prior art systems is eliminated. The applicant generally feels that the first and simplest approach has equal or better performance than the second, more conventional method.

In the second, two channel technique, the foregoing combination, constituting one channel, is combined with a second channel comprised of time delay means for receiving the recorded input signal and delaying it by a period of $T_{min}/2$ and second pulse slimming filter means for receiving the delayed input signal pulse and slimming it until one-half of the main lobe time width of the slimmed pulse is equal to the time period $T_{min}$. Means are provided for differentiating the slimmed pulses with respect to time. Second limiter means receive the time differentiated, slimmed pulses, and produce an output signal which has abrupt output transitions whenever the time differentiated, slimmed pulse signal crosses the hypothetical zero reference voltage level. Edge selector logic receives the outputs of the first and second limiter means and produces an output pulse whose leading edge coincides in time with the first zero reference voltage transition of the second limiter means output following a zero reference voltage transition of the first limiter means output.

It is therefore an object of the invention to provide a system for equalizing the DC null in playing back a digital magnetic recording.

It is another object of the invention to reproduce an input waveform of NRZ recorded signals in the analog realm while simultaneously restoring its DC content.

The foregoing and other objects, features and advantages of the invention will be more readily understood upon consideration of the following detailed description of certain preferred embodiments of the invention, when taken in conjunction with the accompanying drawings.

BRIEF DESCRIPTION OF THE DRAWINGS

FIG. 1 is a block diagram of the system according to the invention for equalizing DC null;

FIGS. 2a and 2b are waveform diagrams for use in illustrating the operation of the circuit depicted in FIG. 1;

FIGS. 3a and 3b are circuit diagrams for use in explaining the operation of the signal centering unit portion of the invention depicted in FIG. 1;

FIGS. 4a, 4b and 4c are waveform diagrams for use in explaining the circuits depicted in FIGS. 3a and 3b;

FIG. 5 is a circuit diagram for use in explaining the signal centering circuit depicted in FIG. 1;

FIGS. 6a, 6b and 6c are waveform diagrams for use in explaining the operation of the circuit depicted in FIG. 5;

FIG. 7 is a block diagram of a differentiator based system with DC restoration applied as a gate generator;

FIGS. 8a, 8b, 8c, 8d, 8e and 8f are waveform diagrams for use in explaining the operation of the two channel system depicted in FIG. 7;

FIG. 9, including 9A and 9B, is a detailed schematic diagram of the circuit depicted in FIG. 7; and FIGS. 10a and 10b are waveform diagrams for use in explaining the operation of the system depicted in FIG. 7.

DETAILED DESCRIPTION OF CERTAIN PREFERRED EMBODIMENTS

Referring now more particularly to FIG. 1, a transducer 10, in the form of a magnetic read head, produces an output response to an isolated transition in the NRZ data being read which is modeled as a Lorentzian function whose tails asymtotically but slowly approach zero. The transducer output 10 is supplied to the input of a first pulse slimming filter 12 which is designed as a matched filter composed with the minimum bias window. Its output is a time contained (slimmed) pulse which has undergone minimum degradation in its signal to noise ratio (SNR).

As illustrated in FIG. 2a, the one-half main lobe time width of the slimmed pulse is set to one-half of the minimum time between transitions, i.e., $T_{min}$. Note that this is twice as much slimming as would be normally performed in order to obtain 100 percent resolution on this filter output and it makes the area under each slimmed pulse exactly equal. This is necessary, as illustrated in FIG. 2b, in order to obtain an integrator output which has 100 percent resolution. The output of the slimming pulse filter is supplied to an integrator 14, which produces a peak to peak output amplitude that is independent of the data dependent time between transitions.

Referring now more particularly to FIGS. 3a, 3b, 4a, 4b and 4c, the task of restoring the DC component comprises centering the midpoint between the extreme peak amplitudes of the integrator output on a zero reference. This appropriately centered waveform crosses zero on time with the peaks of the transducer output as desired. This signal is then fed to the limiter 18 to reproduce the NRZ data waveform. The operation of the signal centering unit 16 is explained by reviewing the self biasing characteristics of an inverted A.M. detector shown in FIG. 3a. Previous applications of this type of circuit include power supply voltage multipliers and phase detectors.

Referring to FIG. 3a, a voltage source 20 which generates a voltage $V_1$ whose positive pulse waveform is illustrated in FIG. 4a, is connected such that its positive polarity output feeds through a capacitor 22 to the anode of a diode 24. The cathode of the diode 24 is connected to the circuit ground and returns to the voltage source 20. The output $V_2$ is taken at the anode of the diode 24 and is depicted in FIG. 4b. An ideal diode allows no forward voltage drop and no reverse current flow. Therefore, in FIG. 4b, the signal voltage source, $V_1$, drives positive current through the capacitor 22 to the anode of the diode 24, building up a charge on capacitor 22. The forward voltage drop across the diode 24 is zero. When $V_1$ decreases, the diode becomes reverse biased, i.e., no current flows through it. In a steady state, the output voltage $V_2$ in FIG. 3c represents an AC coupled version of the input wave form $V_1$, but offset in DC value from a zero reference voltage line 26 such that the most positive peak is clamped at zero potential.

Referring to FIG. 3b and FIG. 4c, with the polarity of the diode 24' reversed so that the cathode is connected to the positive output of the voltage source 20' and the anode is connected to the circuit ground, an output voltage $V_2'$ is produced at the junction of the cathode of the diode 24' and the capacitor 22' which is depicted in FIG. 4c. This output represents an AC coupled version of the input wave form $V_1$, but is offset in DC value such that the most negative value of the wave form is clamped at the zero reference line potential 26. The circuits of FIGS. 3a and 3b can be combined to produce the signal centering unit illustrated in FIG. 5.

Referring to the schematic of FIG. 5, the output of the pulse slimming circuit 12 is supplied to the input terminals 26 and 28 of the integrator 14. The integrator 14 has two outputs 32 and 34. The integrator output terminal 32 is connected through a first capacitor 36 to the anode of a diode 46 and through a second capacitor 38 to the cathode of a diode 44. The integrator output terminal 34 is connected through a third capacitor 40 to the anode of the diode 44 and through a fourth capacitor 42 to the cathode of the diode 46.

The output terminal 56 of the signal centering unit is connected through a first resistor 48 to the anode of diode 46 and is connected through a second resistor 50 to the cathode of diode 44. The output terminal 58 of the signal centering unit is connected through a third resistor 52 to the anode of the diode 44 and is connected through a fourth resistor 54 to the cathode of the diode 46.

If the voltage at the cathode of the diode 44 with respect to its anode is labeled $V_{aa'}$ and the voltage at the anode of the diode 46 with respect its cathode is labeled $V_{bb'}$, then the output wave forms $V_{aa'}$ and $V_{bb'}$ are depicted in FIGS. 6a and 6b. The differential voltage $V_{aa'}$ across the diode 44 cannot go negative, i.e., its negative peaks are clamped to zero reference, as shown in FIG. 6a. Also, the differential voltage $V_{bb'}$ across diode 46 cannot go positive, i.e., its positive peaks are clamped to zero reference, as illustrated in FIG. 6b. These two differential voltages are summed with equal weight through summing resistors 48, 50, 52 and 54, which have equal resistances, to obtain a voltage between the output terminals 56 and 58 denoted $V_{xx'}$. This wave form is depicted in FIG. 6c. This is DC coupled summation; consequently, the zero difference reference occurs exactly midway between the peaks of the wave form $V_{xx'}$, that is: $V_{xx'} = (V_{aa'} + V_{bb'})/2$.

The limitor 18 will produce an abrupt output transition whenever its input crosses zero difference. Thus, when the signal centering unit 16 is attached to the integrator 14, as illustrated in FIG. 1, NRZ data is reproduced.

The above described circuit and technique is based upon an a priori knowledge concerning the nature of the signal to be processed, coupled with a non-linear device, namely the signal centering unit. The philosophy behind matched filtering is similar except that the process is restricted to being linear.

There are essentially two approaches in applying the system of the invention to read detector design. The first approach uses the block diagram of FIG. 1, which reproduces the recorded pattern directly. The second approach applies the technique of the invention as a gate generator for a matched filter/optimum time containment/differentiator system. In either of these two approaches, the automatic gain or threshhold control is eliminated. There are strong indications that the first and simplest approach has equal or better performance than the second method. A signal to noise advantage of 4.0 db is claimed for the integrator 14 over the differentiator for a truncated parabolic approximation to the disk-dominant chromatic noise power spectral density.

Furthermore, experimentally observed improvements in performance have been claimed for DC null equlization using decision feedback. Although better analysis is needed, there is ample evidence to indicate the attractiveness of the first approach given in FIG. 1, and this is further substantiated by observations made on an experimental read detector in which the second approach was taken. The second approach will now be described in greater detail in reference to FIGS. 7 through 9.

The output of the transducer 10 is supplied both to the circuit depicted in FIG. 1 (labeled with the same reference numerals primed) and to the input of a time delay 60 having a time delay equal to $T_{min}/2$. It is to be remembered that $T_{min}$ equals the minimum time between transitions as shown in FIG. 2. The output of the delay unit 60 is supplied to a second pulse slimming filter 62 whose slimming is such that one-half of the main lobe width of the slimmed pulse is set less than or equal to $T_{min}$. This achieves 100 percent resolution at the input to the differentiator 64 which receives the output of the filter 62. The differentiator 64 differentiates the input signal with respect to time and supplies a differentiated output to a second limiter 66. The outputs of the limiters 18' and 66 are separately supplied to edge selector logic 68 which produces output data pulses. The operations of these various block diagrams and circuits will now be described in greater detail with reference to FIGS. 8a, 8b, 8c, 8d, 8e and 8f.

The wave form depicted in FIG. 8a represents the write current. The wave form depicted in FIG. 8b represents the output of the pulse slimming filter 62. The wave form depicted in FIG. 8c represents the output of the differentiator circuit 64. The wave form of FIG. 8d represents the output of the limiter 66. The output of the limiter 18' is depicted in FIG. 8e and the output data pulse from the edge selector logic 68 is depicted in FIG. 8f.

The noisy transitions on the output of the limiter 66 (FIG. 8d) are suppressed by allowing only the first transition to pass following the occurrence of a transition on the restored write current wave form, FIG. 8e, which is the output of the limiter 18'. The pulse output signal from the edge selector logic 68, as depicted in FIG. 8f, is a series of pulses whose positive going edges mark the time location of the peaks of the output of pulse slimming filter 62, FIG. 8b. The edge selector logic 68 that performs the function of passing the first alternate transitions comprises a dual edge triggered type D flip-flop and a pair of AND gates, as shown in greater detail in FIG. 9. To allow for the greatest possible margin against degradation caused by noise, the delay indicated in FIG. 7 is set to $T_{min}/2$ to center the gate transition, FIG. 8e, between the minimum spaced transitions of the output of the limiter 66, as shown in FIG. 8d.

The circuit of FIG. 7 is depicted in schematic detail form in FIG. 9.

This more complicated, two-channel system, is better for error rate performance and robustness against media defects. It is expected that further analysis will reveal that in most applications the single channel system will give the best noise margins and, generally, the system with the best noise margins also exhibits the greater robustness against media defects.

FIGS. 10a and 10b illustrate that $T_{min}/2$ is the optimum relative delay. These figures are achieved by reading a uniform high frequency pattern ($T_{min}$ between transitions). The analog wave forms at the output of the differentiators 64 and the integrator 14' will be approximately sinusoidal with the former lagging the latter by 90 degrees. Applying the differentiator output to the X-axis deflection of an oscilloscope, the integrator output applied to the Y-axis will generate a circular Lissajou figure. One can graphically view the relative SNR performance of the two channels and the noise margin of the overall system by looking at this figure.

These wave forms were generated in an experimental read detector of the type described. FIG. 10a shows the nearly sinusoidal limiter inputs—the integrator output is set to lead the differentiator output. FIG. 10b shows the resulting Lissajou patterns. Both channels exhibit about the same SNR performance as interpreted by the fact that the ratio of the thickness of the trace (which corresponds approximately to the standard deviation of the noise) to the distance from the origin is about the same in both the X and Y dimensions.

Thus, the invention provides a simple and economical apparatus for restoring the DC null in digital magnetic recording. It may be applied as the primary read detector apparatus or as a gate generator for matched filter/time-containment/differentiator systems. In either application, it displaces the need for automatic gain control or its dual: the automatic tracking threshhold.

In the foregoing description the pulse slimming filter 12' and the time delay means 60 were described in terms of a time period $T_{min}/2$. While this is the most advantageous period for the reasons previously described, in other, less advantageous embodiments this time period could be $T_{min}/N$ where N is greater than two.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. A circuit for centering an alternating current input signal about a zero reference voltage level, the circuit comprising
    first and second input terminals for receiving the input signal,
    first and second output terminals,
    first, second, third and fourth resistors, and
    first and second diodes, and wherein
    the first input terminal is connected through the first capacitor to the anode of the second diode and through the second capacitor to the cathode of the first diode,
    the second input terminal is connected through the third capacitor to the anode of the first diode and through the fourth capacitor to the cathode of the second diode,
    the first output terminal is connected through the first resistor to the anode of the second diode and through the second resistor to the cathode of the first diode, and
    the second output terminal is connected through the third resistor to the anode of the first diode and through the fourth resistor to the cathode of the second diode.

2. In combination with the circuit recited in claim 1, apparatus for reproducing non-return to zero reference data from an alternating polarity input pulse signal comprising first pulse slimming filter means for receiving each input pulse and for slimming it until one-half the main lobe time width of the slimmed pulse is equal to one-half of the minimum time between transitions ($T_{min}/2$), integrator means for integrating the slimmed pulse output of the first pulse slimming filter means and for supplying an integrated output signal to the first and second input terminals of the centering circuit, and first limiter means connected to the first and second output terminals of the centering circuit for producing an output signal which has abrupt output transitions whenever the output signal of the centering circuit crosses the zero reference voltage level.

3. The combination as recited in claim 2 further comprising transducer means for generating the input signal.

4. The combination recited in claim 2 further comprising time delay means for receiving the input signal and delaying it by a period of $T_{min}/2$, second pulse slimming filter means for receiving the delayed input signal pulses from the time delay means and for slimming each pulse until one-half of the main lobe time width of the slimmed pulse is equal to the time period $T_{min}$, means for diferentiating with respect to time the pulses slimmed by the second pulse slimming means, second limiter means for receiving the time differentiated, slimmed pulses and for producing an output signal which has abrupt output transitions whenever the time differentiated, slimmed pulse signal crosses the zero reference voltage level, and edge selector logic for receiving the outputs of the first and second limiter means and for producing an output pulse whose leading edge coincides in time with the first zero reference voltage transition of the second limiter means output following a zero reference voltage transition of the first limiter means output.

5. Apparatus for equalizing the direct current null in reproducing a high density digital pulse recording comprising transducer means for generating a pulse signal modeled as a Lorentzian function whose tails asymtotically but slowly approach zero, first pulse slimming filter means for receiving each transducer pulse and for slimming it until one-half the main lobe time width of the slimmed pulse is equal to a time $T_{min}/N$ where $T_{min}$ is the minimum time between polarity transitions and N is an integer, integrator means for integrating the slimmed pulse output of the first pulse slimming filter means, centering circuit means connected to the integrator means for producing an output signal representative of the integrated pulse centered about a zero reference voltage level, and first limiter means connected to the centering circuit for producing an output signal which has abrupt output transitions whenever the output signal of the centering circuit crosses the zero reference voltage level.

6. Apparatus as recited in claim 5 wherein the centering circuit means comprise first and second input terminals for receiving the integrated pulse, first and second output terminals, first, second, third and fourth resistors, and first and second diodes, and wherein the first input terminal is connected through the first capacitor to the anode of the second diode and through the second capacitor to the cathode of the first diode, the second input terminal is connected through the third capacitor to the anode of the first diode and through the fourth capacitor to the cathode of the second diode, the first output terminal is connected through the first resistor to the anode of the second diode and through the second resistor to the cathode of the first diode, and the second output terminal is connected through the third resistor to the anode of the first diode and through the fourth resistor to the cathode of the second diode.

7. Apparatus as recited in claim 5 further comprising time delay means for receiving the transducer generated signal and delaying it by a perod of $T_{min}/N$, second pulse slimming filter means for receiving the delayed input signal pulses from the time delay means and for slimming each pulse until one-half of the main lobe time width of the slimmed pulse is equal to the time period $T_{min}$, means for differentiating with respect to time the pulses slimmed by the second pulse slimming means, second limiter means for receiving the time differentiated, slimmed pulses and for producing an output signal which has abrupt output transitions whenever the time differentiated, slimmed pulse signal crosses the zero reference voltage level, and edge selector logic for receiving the outputs of the first and second limiter means and for producing an output pulse whose leading edge coincides in time with the first zero reference voltage transition of the second limiter means output following a zero reference voltage transition of the first limiter means output.

8. Apparatus as recited in claims 5 or 7 wherein $N \geq 2$.

9. A method for equalizing direct current null during reproduction of a recorded digital signal comprising the steps of transducing the recorded signal to produce a pulse signal modeled as a Lorentzian function whose tails asymtotically but slowly approach zero, slimming the pulse signal until one-half of its main lobe time width is equal to one-half of the minimum time between polarity transitions, integrating the slimmed pulse with respect to time, centering the integrated pulse about a zero reference voltage level, and limiting the centered pulse signal to generate a first output pulse signal which has abrupt output polarity changes whenever the centered, integrated pulse crosses the zero reference voltage level.

10. A method as recited in claim 10 further comprising additional steps which are carried out separately and simultaneously with the method steps of claim 10, these additional steps comprising delaying the pulse signal by a time period equal to one-half of the minimum time between polarity transitions, slimming the time delayed pulse until one-half of the main lobe time width is equal to one-half of the minimum time between polarity transitions, differentiating the time delayed, slimmed pulse with respect to time, limiting the differentiated pulse signal to generate a second pulse output signal which has abrupt polarity changes whenever the differentiated pulse signal crosses the zero reference voltage level, and sensing the zero reference transitions of the first and second pulse output signals and generating a third output pulse signal whose leading edge is time coincident with the first zero reference voltage transition of the second output pulse signal following a zero reference voltage transition of the first output pulse signal.

* * * * *